United States Patent
Williams

(10) Patent No.: US 10,432,504 B2
(45) Date of Patent: Oct. 1, 2019

(54) MESSAGE PROCESSING

(71) Applicant: METASWITCH NETWORKS LTD., Enfield (GB)

(72) Inventor: Matthew Williams, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 304 days.

(21) Appl. No.: 15/337,816

(22) Filed: Oct. 28, 2016

(65) Prior Publication Data

US 2017/0048136 A1      Feb. 16, 2017

Related U.S. Application Data

(63) Continuation of application No. PCT/GB2015/051224, filed on Apr. 27, 2015.

(30) Foreign Application Priority Data

Apr. 30, 2014   (GB) .................................. 1407627.7

(51) Int. Cl.
| | | |
|---|---|---|
| G06F 15/173 | (2006.01) | |
| H04L 12/707 | (2013.01) | |
| H04L 29/12 | (2006.01) | |
| H04L 29/14 | (2006.01) | |
| H04L 29/08 | (2006.01) | |
| H04L 29/06 | (2006.01) | |
| H04L 12/725 | (2013.01) | |

(52) U.S. Cl.
CPC .......... *H04L 45/22* (2013.01); *H04L 61/1511* (2013.01); *H04L 61/1588* (2013.01); *H04L 65/1016* (2013.01); *H04L 65/1046* (2013.01); *H04L 65/1073* (2013.01); *H04L 67/10* (2013.01); *H04L 69/40* (2013.01); *H04L 45/304* (2013.01); *H04L 63/0892* (2013.01)

(58) Field of Classification Search
CPC ... H04L 45/304; H04L 45/22; H04L 61/1511; H04L 61/1588; H04L 69/40; H04L 63/0892; H04L 67/10; H04L 65/1016; H04L 65/1046; H04L 65/1073
USPC ......................................... 709/223, 203, 206
See application file for complete search history.

(56) References Cited

U.S. PATENT DOCUMENTS

| | | |
|---|---|---|
| 6,779,039 B1 | 8/2004 | Bommareddy et al. |
| 7,451,209 B1 | 11/2008 | Schieber et al. |
| 2010/0299451 A1 | 11/2010 | Yigang et al. |
| 2011/0023091 A1 | 1/2011 | Lukach et al. |

(Continued)

FOREIGN PATENT DOCUMENTS

CN      103039049      * 4/2013  ............. H04L 45/22

OTHER PUBLICATIONS

Calhoun et al.; ""Diameter Base Protocol"" Network Working Group, Request for Comments: 3588, Category: Standards Track, RFC 3588, Sep. 2003 (Sep. 2003).

(Continued)

*Primary Examiner* — Frantz B Jean
(74) *Attorney, Agent, or Firm* — EIP US LLP

(57) ABSTRACT

A message is processed at a node in a cluster of nodes. The message is received at the node. The message is addressed to at least one other node in the cluster. At least one action associated with the message is performed at the node. A response message is transmitted indicating that the at least one action has been performed.

18 Claims, 5 Drawing Sheets

(56) References Cited

U.S. PATENT DOCUMENTS

| | | | |
|---|---|---|---|
| 2011/0029689 A1* | 2/2011 | Darbyshire | H04L 69/40 709/238 |
| 2011/0199895 A1* | 8/2011 | Kanode | H04L 63/0892 370/225 |
| 2011/0211527 A1* | 9/2011 | Agarwal | H04L 61/1588 370/328 |
| 2011/0282904 A1* | 11/2011 | Schaedler | H04L 29/06 707/769 |
| 2012/0005523 A1 | 1/2012 | Korhonen et al. | |
| 2012/0131639 A1 | 5/2012 | Alex et al. | |
| 2012/0163297 A1* | 6/2012 | Agarwal | H04L 12/1425 370/328 |
| 2012/0225679 A1 | 9/2012 | McCann et al. | |
| 2013/0185767 A1 | 7/2013 | Tirupachur Comerica et al. | |
| 2013/0322448 A1 | 12/2013 | Vihtari et al. | |
| 2014/0258423 A1* | 9/2014 | Schaedler | H04L 29/06 709/206 |

OTHER PUBLICATIONS

Fajardo et al.; "'Diameter Base Protocol'" Internet Engineering Task Force (IETF), Request for Comments: 6733, Obsoletes: 3588, 5719, Category: Standards Track, ISSN: 2070-1721, Oct. 2012 (Oct. 2012).

3GPP TS 29.228 V12.1.0, 3rd Generation Partnership Project, Technical Specification Group Core Network and Terminals, IP Multimedia (IM) Subsystem Cx and Dx interfaces, Signalling flows and message contents, (Release 12) Dec. 2013 (Dec. 2013).

3GPP TS 29.229 V12.1.0, 3rd Generation Partnership Project, Technical Specification Group Core Network and Terminals, Cx and Dx interfaces based on the Diameter protocol, Protocol details, (Release 12), Dec. 2013 (Dec. 2012).

Metaswitch Networks LTD / Klausner, Written under contract by nfotex IT GmbH, http://nfotex.com/, Retrieved from the Internet: URL:https://github.com/Metaswitch/freeDiameter/blob/master/extensions/rt_ignore_dh/rt_ignore_dh.c, 2013.

Klausner, Written under contract by nfotex IT GmbH, http://nfotex.com/, Retrieved from the Internet: http://www.freediameter.net/trac/browser/freeDiameter/extensions/rt_ignore_dh/rt_ignore_dh.c?rev=1043, 2013.

Metaswitch Networks LTD / Decugis, Retrieved from the Internet: https://github.com/Metaswitch/freeDiameter/tree/954a518fbf4cd836f3fc9937d7a8c8b79dca3d7f.

United Kingdom Search report dated Dec. 19, 2014 for United Kingdom application No. 1407627.7.

International Search report and Written Opinion dated Jul. 21, 2015 for International PCT application No. PCT/GB2015/051224.

United Kingdom Search report dated Aug. 12, 2015 for United Kingdom application No. 1407627.7.

United Kingdom Search report dated Aug. 13, 2015 for United Kingdom application No. 1407627.7.

* cited by examiner

MESSAGE PROCESSING

CROSS-REFERENCE TO RELATED APPLICATIONS

This application is a continuation of International Application No. PCT/GB2015/051224, filed Apr. 27, 2015, which claims the benefit of GB Application No. 1407627.7, filed Apr. 30, 2014. Each of the above-referenced patent applications is incorporated by reference in its entirety.

BACKGROUND OF THE INVENTION

Field of the Invention

The present disclosure relates to methods, apparatus, nodes, computer programs and computer program products for message processing.

Description of the Related Technology

A group of nodes can be configured as a cluster. Externally, the cluster can appear to be a single system. Clusters may experience node failure in which at least one node in the cluster becomes at least temporarily unavailable. It is desirable in such cases for the cluster to continue to be able to handle messages destined for the cluster notwithstanding the node failure.

One known approach is to provide a cluster of fault-tolerant (or 'redundant') pairs of nodes. Each pair includes an active (or 'primary') node and a standby (or 'secondary') node. If the active node fails, its paired standby node can take over as a replacement active node. Although this may enable the cluster to continue to operate in the event of node failure, it requires the additional resources associated with deploying pairs of nodes.

It would be desirable to provide improved and/or alternative techniques for processing of messages in a cluster of nodes.

SUMMARY

In accordance with first embodiments, there is provided a method of processing a message at a node in a cluster of nodes, the method comprising: receiving a message at the node, the message being addressed to at least one other node in the cluster; performing, at the node, at least one action associated with the message; and transmitting a response message indicating that the at least one action has been performed.

In accordance with second embodiments, there is provided apparatus for processing a message at a node in a cluster of nodes, the apparatus being configured to: perform at least one action in response to a message addressed to at least one other node in the cluster being received at the node; and cause a response message indicating that the at least one action has been performed to be transmitted.

In accordance with third embodiments, there is provided a computer program product comprising a non-transitory computer-readable storage medium having computer readable instructions stored thereon, the computer readable instructions being executable by a computerized device to cause the computerized device to perform a method of processing a message at a node in a cluster of nodes, the method comprising: receiving a message at the node, the message being addressed to at least one other node in the cluster; performing, at the node, at least one action associated with the message; and transmitting a response message indicating that the at least one action has been performed.

Further features and advantages will become apparent from the following description of embodiments, given by way of example only, which is made with reference to the accompanying drawings.

DETAILED DESCRIPTION OF CERTAIN INVENTIVE EMBODIMENTS

Figure 1:
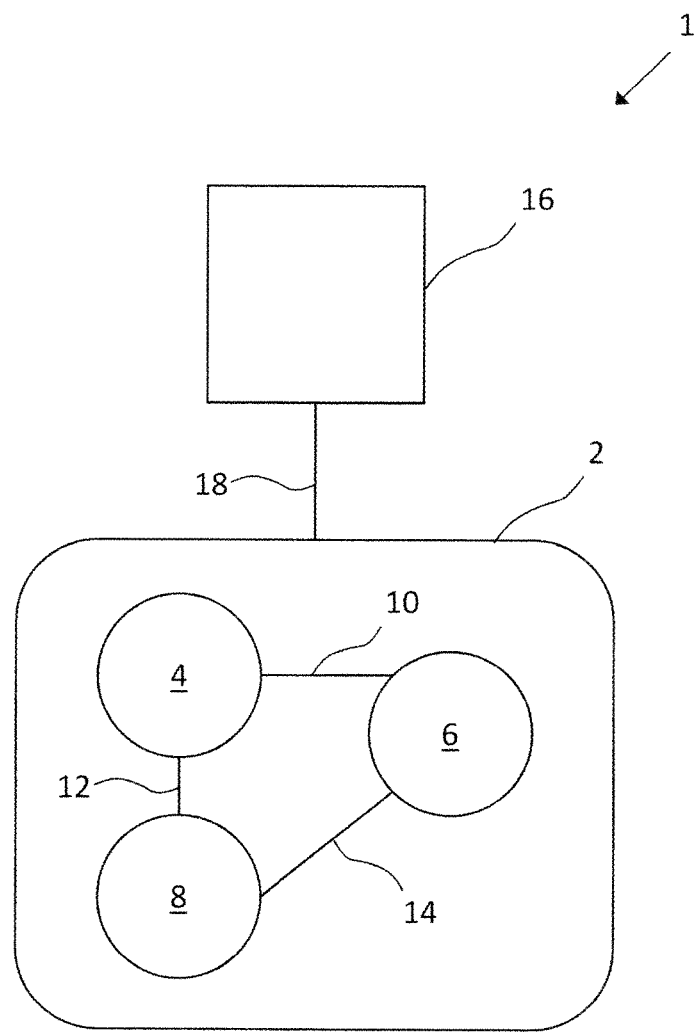
FIG. 1 shows a block diagram of an example of a network in which message processing is carried out in accordance with embodiments.

Referring to FIG. 1, there is shown an example of a communications network (hereinafter 'network') 1 in which message processing may be carried out in accordance with embodiments. In some examples, the network 1 comprises a packet-switched network such as an Internet Protocol (IP) network. The network 1 may enable provision of telephony services. In some examples, the network 1 conforms to the IP Multimedia Subsystem (IMS).

The network 1 comprises a node cluster (or 'cluster of nodes') 2. The cluster 2 comprises a plurality of nodes. In this specific example, the cluster 2 comprises three nodes 4, 6, 8. It will be appreciated however that the cluster 2 could comprise a different number of nodes. In some examples, each node 4, 6, 8 corresponds to a separate physical computing device. In other examples, multiple nodes may be implemented on the same physical computing device. Where the network 1 is an IMS network, some or all of the nodes 4, 6, 8 may be Call Session Control Function (CSCF) entities. A CSCF is responsible for conducting registration procedures, handling routing requests and/or handling service requests in an IMS network.

In some examples, each node 4, 6, 8 in the cluster 2 maintains state information for subscribers served by that node 4, 6, 8. Examples of state information include but are not limited to routing data and authentication data. For relatively small numbers of subscribers, each node 4, 6, 8 may maintain state information for every subscriber. However, for large numbers of subscribers, the memory requirements for storing state information for every subscriber at each node 4, 6, 8 and the requirements for replicating the state information between all nodes 4, 6, 8 in the cluster 2 can become prohibitive.

In some examples, in order to cater for larger numbers of subscribers, so-called 'sharding' techniques may be employed in IMS networks. Sharding involves allocating a longstanding responsibility for a subset of the subscribers in the network 1 to each of the nodes 4, 6, 8. Each node 4, 6, 8 only maintains state information for its allocated subset of subscribers. In some examples, when a subscriber device (not shown) registers with the network 1, it may be allocated to a Serving CSCF (S-CSCF), in the case of IMS, which is thereafter responsible for maintaining the appropriate state information for that subscriber until such time as the device de-registers from the network 1. This approach may suffer from increased routing complexity because messages relating to a given subscriber that are handled after the initial registration are routed via the appropriate sharded node 4, 6, 8.

In other examples described below with reference to FIG. 2, the nodes 4, 6, 8 have access to a shared data store.

In this example, the first and second nodes 4, 6 are communicatively coupled to each other via a first connection 10. In this example, the first and third nodes 4, 8 are communicatively coupled to each other via a second connection 12. In this example, the second and third nodes 6, 8 are communicatively coupled to each other via a third connection 14. Various different types of connection can be used for the first, second and third connections 10, 12, 14 depending upon, for example, the characteristics of the nodes 4, 6, 8. By way of example only, such connections may use the Transmission Control Protocol (TCP) or a secure version of TCP, for example TLS/TCP, where TLS stands for Transport Layer Security. By way of further example, such connections may use the Stream Control Transmission Protocol (SCTP) or a secure version of SCTP, for example DTLS/SCTP, where DTLS stands for Datagram Transport Layer Security. In some examples, some or all of the connections 10, 12, 14 are logical connections, for example where multiple nodes 4, 6, 8 are implemented on the same physical computing device.

In this example, the network 1 also comprises a communication device 16. The communication device 16 communicates data with nodes 4, 6, 8 in the cluster 2. For example, the communication device 16 may transmit data to and/or receive data from the node cluster 2. Such data may comprise, for example, one or more messages. Examples of such messages include, but are not limited to, request messages, information update messages and messages comprising commands. In some examples, the communication device 16 comprises one or more computing devices. The one or more computing devices may comprise, for example, one or more servers. In examples in which the communication device 16 comprises a plurality of computing devices, the computing devices may be co-located or may be remotely located from each other.

In this specific example, the communication device 16 is located outside of the cluster 2.

In this example, the communication device 16 is communicatively coupled to the cluster 2 via a fourth connection 18. Various different types of connection can be used for the fourth connection 18 depending upon, for example, the characteristics of the communication device 16. By way of example only, the fourth connection 18 may use TCP, TLS/TCP, SCTP or DTLS/SCTP.

Message processing is carried out in the network 1 in accordance with embodiments. In one such embodiment, a message is processed at a node 4, 6, 8 in the node cluster 2. A message is received at the node 4, 6, 8. The message is addressed to at least one other node 4, 6, 8 in the node cluster 2 (i.e. the message is received at a different node from the node to which it is addressed). At least one action associated with the message is performed at the node 4, 6, 8. A response message is transmitted indicating that the at least one action has been performed.

Figure 2:
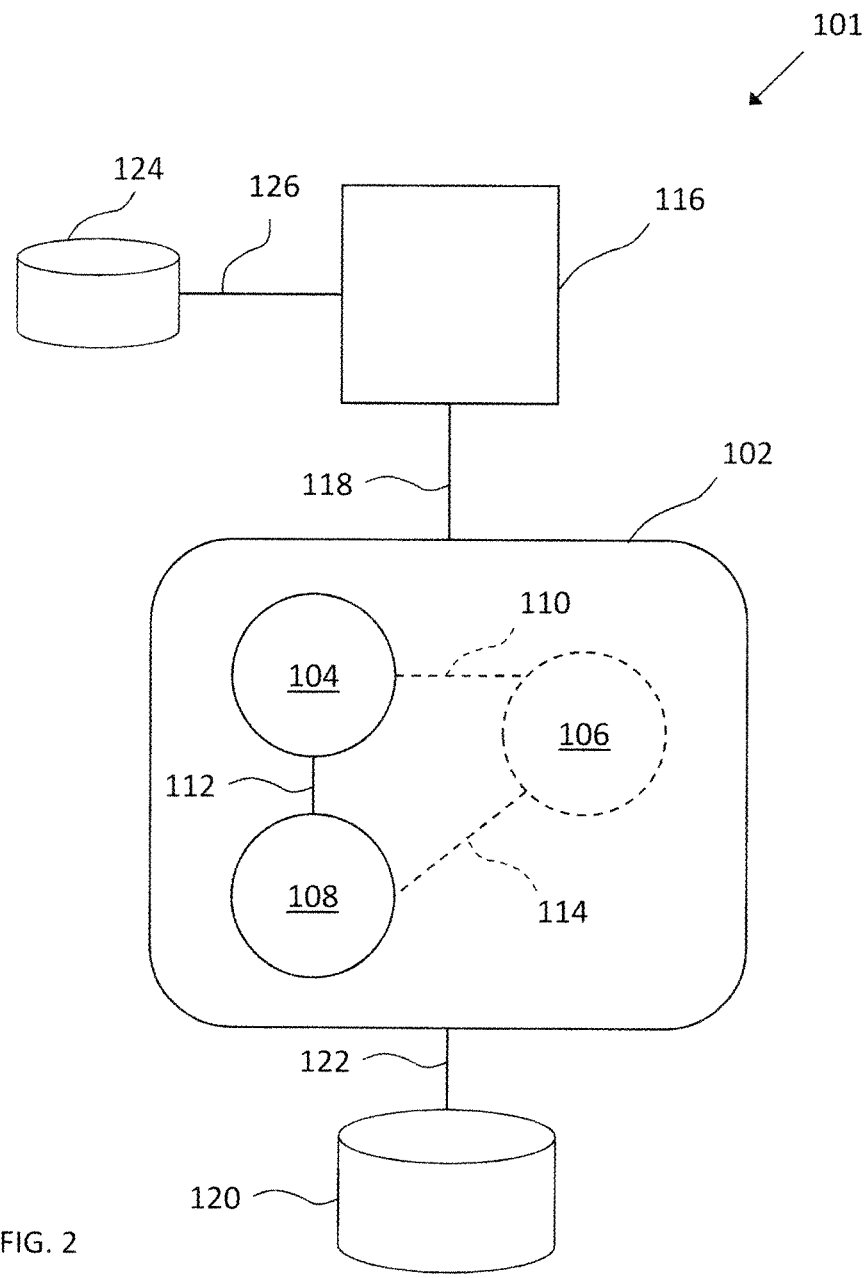
FIG. 2 shows a block diagram of another example of a network in which message processing is carried out in accordance with embodiments.

Referring to FIG. 2, there is shown another example of a network 101 in which message processing is carried out in accordance with embodiments. The network 101 shown in FIG. 2 has several features which are the same as, or are similar to, those of the network 1 shown in FIG. 1. Such features in FIG. 2 have the same reference number as the corresponding feature in FIG. 1 but incremented by 100.

In addition to the features of the network 1 shown in FIG. 1, the network 101 shown in FIG. 2 comprises a shared (or 'clustered') data store 120. In this example, the shared data store 120 is communicatively coupled to the cluster 102 via a fifth connection 122. By way of example only, the fifth connection 122 may use TCP or SCTP. Depending on reliability requirements, for example, another protocol such as for example, the User Datagram Protocol (UDP) may be useable.

For convenience and brevity, in the specific example described below with reference to FIG. 2, the communication device 116 comprises a home subscriber server (HSS), it being understood that the communication device 116 could be a different type of entity, e.g. if the network 101 is not an IMS network. An HSS stores subscriber-related information, such as subscriber profile information, can perform authentication and authorization of a subscriber or subscriber device and can provide information on a location of a subscriber device. The HSS 116 has access to an HSS database (hereinafter 'database') 124. The database 124 may, for example, store the subscriber profile information. In some examples, the HSS 116 can read data from and/or write data to the subscriber database 124 via a sixth connection 126. The sixth connection 126 may in some examples be a logical connection, rather than a physical connection. A logical connection may for example be a local inter-process connection, which need not use a network protocol. Therefore, although the HSS 116 and subscriber database 124 are shown as separate entities in FIG. 2, it will be appreciated that they may be logically separate entities that are embodied in one or more physical entities.

In the network 101 shown in FIG. 2, at least one of the nodes 104, 106, 108 is at least temporarily unavailable. In this specific example, only the second node 106 is at least temporarily unavailable. The at least temporary unavailability of the second node 106 is indicated in FIG. 2 by depicting the second node 106 using a broken line. The first connection 110 between the first node 104 and the second node 106, and the third connection 114 between the second node 106 and the third node 108 are also depicted using broken lines in FIG. 2 to indicate that they are also at least temporarily unavailable.

In this specific example, the network 101 is an IMS network. In this specific example, the nodes 104, 106, 108 are S-CSCFs and the communication device 116 is an HSS. In this specific example, the fourth connection 118 between the HSS 116 and the cluster 102 is a Cx interface. The Cx interface is described in 3GPP specifications TS 29.228 and TS 29.229. The Cx interface uses the Diameter Base Protocol. The Diameter Base Protocol is commonly referred to as 'Diameter'. Diameter was originally defined in the Internet Engineering Task Force's (IETF's) Request for Comments (RFC) 3588, and is also described in the updated specification in IETF RFC 6733.

Diameter introduces several terms and concepts which will now be described, based on the definitions provided in RFC 6733, 1.2.

A 'Diameter node' is a host process that implements the Diameter protocol and acts as a client, an agent, or a server. Diameter specifies that each node has a unique identity. Diameter specifies that the node is uniquely identified using a DiameterIdentity value. Where multiple Diameter nodes run on the same host, each node has a unique identity.

A 'Diameter client' is a Diameter node that supports Diameter client applications as well as the Diameter base protocol.

A 'Diameter agent' is a Diameter node that provides relay, proxy, redirect, or translation services.

A 'Diameter server' is a Diameter node that handles authentication, authorization, and accounting requests for a particular realm. A Diameter server also supports Diameter server applications in addition to the Diameter base protocol.

A 'Realm', also referred to as domain, is used to determine whether messages can be processed locally or whether they should be routed or redirected to a different Diameter node. A realm can be considered to comprise a cluster (or 'group') of nodes. A realm may be therefore shared across many nodes. Diameter specifies that each realm has a unique identity. Diameter specifies that the realm is uniquely identified using a DiameterIdentity value.

Two Diameter nodes sharing a direct TCP or SCTP transport connection are called 'Diameter peers'. A Diameter node will not accept two connections from the same node identity.

The Diameter specification includes a function called 'realm-based routing'. Diameter nodes only know the identity of their directly-connected hosts. In some situations, for example when routing to a different realm, a node may need to transmit a message to another host that is more than one hop away (i.e. not directly-connected). In other words, there may be one or more intermediate nodes between the node that needs to transmit the message and the other host to which the message is to be transmitted. In order to reach such hosts that are multiple hops away, the origin node may look up the realm of the destination node in a local routing table. Alternatively, the origin node may resolve the realm dynamically using the Domain Name System (DNS). The origin node may then send the message to the resulting node, for it to forward on to the destination node. Within a realm, hosts are expected either to have connections to each other or to establish such connections on demand.

According to Diameter, 6.1.4, a node can determine that a message is for local processing at the node in limited circumstances. One such circumstance is that the message is addressed to the node. Another such circumstance is if the message is addressed to the realm with which the node is associated but the message does not include a node identifier. Another such circumstance is where the message includes neither a node identifier nor a realm identifier.

Some Diameter messages must be addressed to a specific node. Such other Diameter messages also specify the realm associated with the specific node. The processing of such other Diameter messages can be difficult in dynamic clusters. For example, the node to which the message is addressed might no longer exist.

Figure 3:
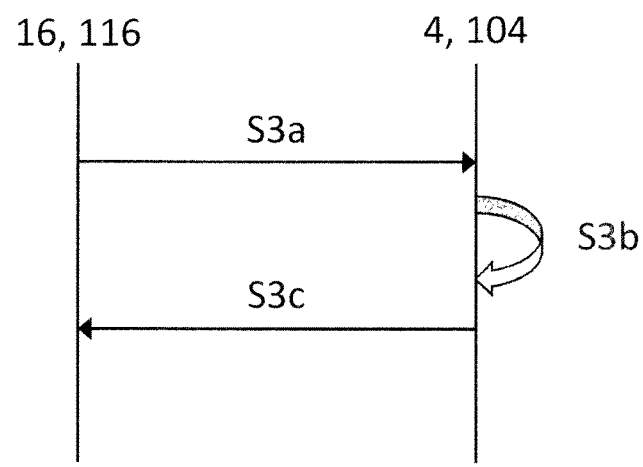
FIG. 3 shows a sequence diagram illustrating an example of a method of processing a message in accordance with embodiments.

Referring to FIG. 3, there is shown a sequence diagram illustrating an example of a method of processing a message in accordance with embodiments. The sequence diagram shown in FIG. 3 depicts an interaction between the communication device 16, 116 and the first node 4, 104, it being understood that in some examples the interaction could occur for example between the communication device 16, 116, the second node 6, 106 and/or the third node 8, 108.

At S3a, the first node 4, 104 receives a message. The message is addressed to at least one other node in the cluster 2, 102. For example, the message could be addressed to the second node 6, 106 and/or the third node 8, 108.

At S3b, the first node 4, 104 performs at least one action associated with the message. The at least one action associated with the message is performed locally at the first node 4, 104 notwithstanding the message being addressed to the at least one other node in the cluster 2, 102.

At S3c, the first node 4, 104 transmits a response message. The response message indicates that the at least one action has been performed.

As such, the first node 4, 104 intercepts (or 'hijacks') the message addressed to the at least one other node in the cluster 2, 102 and performs the at least one action associated with the message itself.

Figure 4:
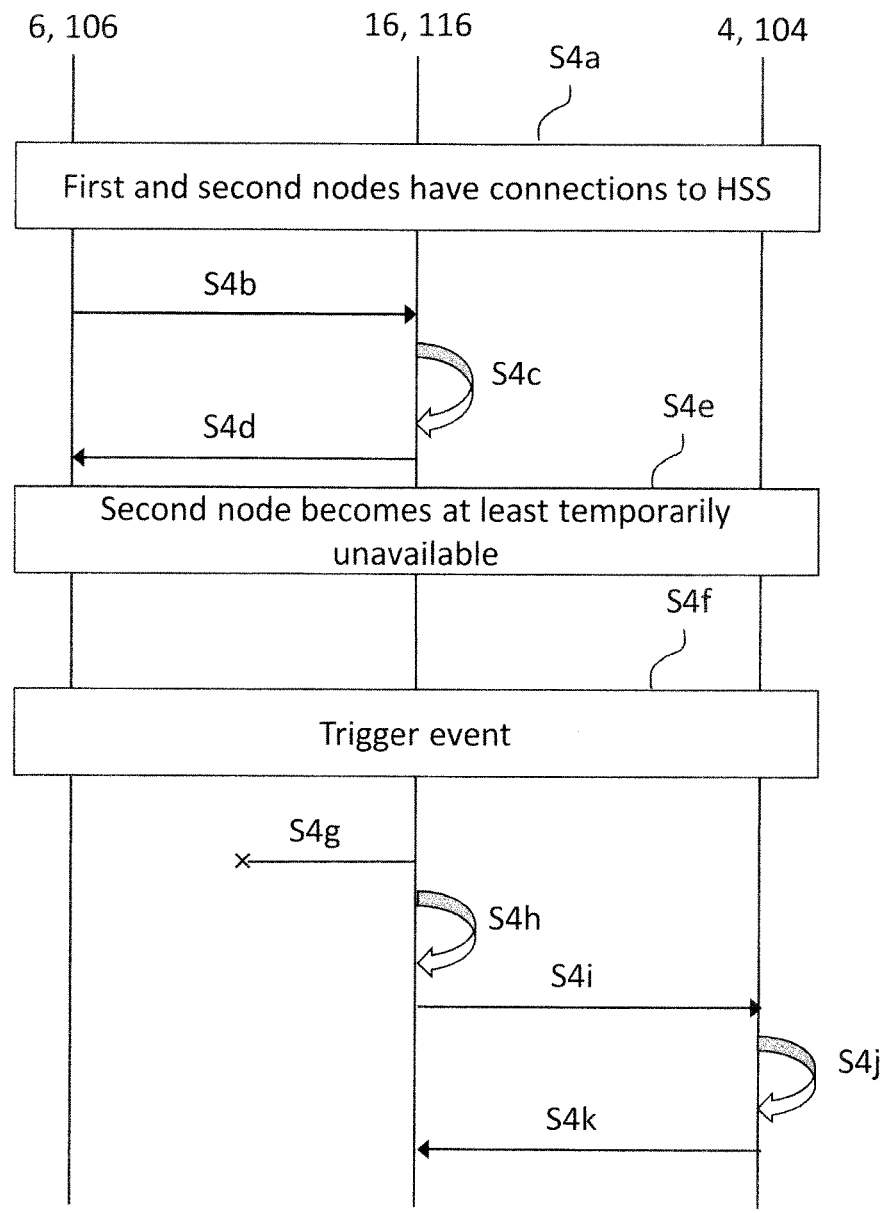
FIG. 4 shows a sequence diagram illustrating another example of a method of processing a message in accordance with embodiments.

Referring to FIG. 4, there is shown a sequence diagram illustrating an example of a method of processing a message in accordance with embodiments. The sequence diagram shown in FIG. 4 depicts an interaction between the first node 4, 104, the second node 6, 106 and an HSS 16, 116, it being understood that in some examples the interaction could occur for example between the HSS 16, 116, the second node 6, 106 and the third node 8, 108.

As explained above, some Diameter messages must be addressed to a specific host and realm of the specific host.

One specific example of such a message is the Push-Profile-Request (PPR) message, defined in 3GPP TS 29.229 V12.1.0, which can be transmitted over a Cx interface based on Diameter. The HSS 16, 116 may, for example, use a PPR message to notify a node in the cluster 2, 102 of one or more changes to a subscriber profile stored in the database 124. The PPR message is addressed to both the realm and node that previously sent a Server-Assignment-Request (SAR) message to the HSS 16, 116. The SAR message, also defined in 3GPP TS 29.229 V12.1.0, is sent from a node currently serving a subscriber to the HSS 16, 116 to allow the HSS 16, 116 to store one or more identifiers of the serving node.

At S4a, the first node 4, 104 and the second node 6, 106 have connections with the HSS 16, 116. In some examples, the first node 4, 104 and the second node 6, 106 are both connected with the HSS 16, 116 via one or more Cx interfaces 18, 118.

At S4b, the second node 6, 106 transmits a message. The message of S4b is transmitted to and is received by the HSS 16, 116. In this example, the message is an SAR message. In this example, the SAR message comprises at least one origin identifier. In this specific example, the at least one origin identifier comprises an origin cluster identifier. The origin cluster identifier indicates that the message originates from the cluster 2, 102. In this specific example, the origin cluster identifier is specified in an Origin-Realm field of the SAR message. In this specific example, the at least one origin identifier also comprises an origin node identifier. The origin node identifier indicates that the SAR message originates from the second node 6, 106. In this specific example, the origin node identifier is specified in an Origin-Host field of the SAR message.

At S4c, the HSS 16, 116 records the at least one origin identifier. In this specific example, the HSS 16, 116 records the origin cluster identifier specified in the Origin-Realm field of the SAR message. In this specific example, the HSS 16, 116 records the origin node identifier specified in the Origin-Host field of the SAR message.

At S4d, the HSS 16, 116 transmits a message. The message of S4d is transmitted to and is received by the second node 6, 106. In this example, the message is a Server-Assignment-Answer (SAA) message. The SAA message, also defined in 3GPP TS 29.229 V12.1.0, is sent from the HSS 16, 166 to the node from which the SAR message was received, which in this example is the second node 6, 106. The SAA message is sent in response to the SAR message and can be used to provide the second node 6, 106 with information to enable the second node 6, 106 to be able to service the subscriber. In this example, the SAA message comprises at least one destination identifier. In this specific example, the at least one destination identifier comprises a destination cluster identifier. The destination cluster identifier indicates that the message is destined for the cluster 2, 102. In this specific example, the destination cluster identifier is specified in a Destination-Realm field of the SAA message. In this specific example, the at least one destination identifier also comprises a destination node identifier. The destination node identifier indicates that the message is destined for the second node 6, 106. In this specific example, the destination node identifier is specified in a Destination-Host field of the SAA message. The SAA message may be routed back towards the second node 6, 106 via the path along which the SAR message was communicated from the second node 6, 106 to the HSS 16, 116. This may be achieved using per-transaction hop-by-hop and end-to-end identifiers, for example.

At S4*e*, the second node 6, 106 becomes at least temporarily unavailable. For example, the second node 6, 106 may fail or may be terminated.

At S4*f*, a trigger event occurs. In this specific example, the trigger event includes a change in a subscriber profile at the HSS 16, 116.

At S4*g*, the HSS 16, 116 transmits a message. The message of S4*g* is transmitted to, but is not received by, the second node 6, 106. This is because the second node 6, 106 became at least temporarily unavailable at S4*e*. In this example, the message is a PPR message. In this example, the PPR message comprises at least one destination identifier. In this specific example, the at least one destination identifier comprises a destination cluster identifier. The destination cluster identifier indicates that the message is destined for the cluster 2, 102. In this specific example, the destination cluster identifier is specified in a Destination-Realm field of the PPR message. In this specific example, the at least one destination identifier also comprises a destination node identifier. The destination node identifier indicates that the PPR message is destined for the second node 6, 106. In this specific example, the destination node identifier is specified in a Destination-Host field of the PPR message.

At S4*h*, the HSS 16, 116 determines that the PPR message of S4*g* has not been received by the second node 6, 106. The HSS 16, 116 may determine the non-receipt in various different ways. In some examples, the HSS 16, 116 may determine the non-receipt in response to detecting failure of an underlying connection to the second node 6, 106, for example a TCP connection failure. In some other examples, the HSS 16, 116 may determine the non-receipt if it does not receive an acknowledgment of receipt by the second node 6, 106 within a predetermined time period (for example a 'time-out period').

At S4*i*, the HSS 16, 116 transmits a message. The message of S4*i* is transmitted to and is received by the first node 4, 104. In this example, the content of the message of S4*i* is the same as that of the message of S4*g*. In other words, the message of S4*i* is a retransmission of the PPR message of S4*g*. In this example, the PPR message comprises at least one destination identifier. In this specific example, the at least one destination identifier comprises a destination cluster identifier. The destination cluster identifier indicates that the message is destined for the cluster 2, 102. In this specific example, the destination cluster identifier is specified in a Destination-Realm field of the PPR message. In this specific example, the at least one destination identifier also comprises a destination node identifier. The destination node identifier indicates that the PPR message is destined for the second node 6, 106. In this specific example, the destination node identifier is specified in a Destination-Host field of the PPR message. Note that, in this example, the destination node identifier indicates that the PPR message is destined for the second node 6, 106, and does not indicate that the PPR message is destined for the first node 4, 104.

In this example, the first node 4, 104 is capable of performing the at least one action associated with the PPR message of S4*i* itself. In some examples, the node inhibits transmission of the PPR message to second node 6, 106. In other words, in such examples, the node is configured not to transmit the PPR message to the second node 6, 106. At S4*j*, the first node 4, 104 performs at least one action associated with the PPR message of S4*i*. In other words, the first node 4, 104 processes the PPR message of S4*i* locally itself, even though the message is addressed to the second node 6, 106. In some examples, the at least one action performed at the first node 4, 104 is dependent upon one or more characteristics of the received message. For example, the at least one action may depend on the specific type of message received. In this specific example, the PPR message includes information associated with the change in the subscriber profile. For example, the message may identify one or more changes to a subscriber profile stored in the shared data store 120. In this specific example, the at least one action performed by the first node 4, 104 includes updating a subscriber profile associated with the subscriber whose profile has changed in the shared data store 120. The PPR message may be considered to be an information update message, in that it provides updated information.

At S4*k*, the first node 4, 104 generates and transmits a message. The message of S4*k* is transmitted to and is received by the HSS 16, 116. The message of S4*k* is a response message and is in response to the message of S4*i*. The response message indicates that the at least one action has been performed. In this example, the message is a Push-Profile-Answer (PPA) message. The PPA message, also defined in 3GPP TS 29.229 V12.1.0, indicates that the subscriber profile associated with the subscriber whose profile has changed has been updated in the shared data store 120. In this example, the PPA message comprises at least one origin identifier. In this specific example, the at least one origin identifier comprises an origin cluster identifier. The origin cluster identifier indicates that the message originates from the cluster 2, 102. In this specific example, the origin cluster identifier is specified in an Origin-Realm field of the PPA message. In this specific example, the at least one origin identifier also comprises an origin node identifier. The origin node identifier indicates that the PPA message originates from the second node 6, 106. In this specific example, the origin node identifier is specified in an Origin-Host field of the PPA message. Note that in this example, the destination node identifier indicates that the PPA message originates from the second node 6, 106, and does not indicate that the message originates from the first node 4, 104.

As explained above, in the example shown in FIG. 4, realm-based routing is used to ensure that a message for a node reaches the cluster 2, 102 with which the node is or was associated. If the node to which the message is addressed is unavailable, the message is intercepted (or 'hijacked') by another node in the cluster 2, 102. The intercepting (or 'hijacking') node then handles the message locally. In other words, the one or more actions associated with the message are performed by the intercepting node. This may allow the message still to be processed even where the node to which it is addressed is unavailable.

In the example shown in FIG. 4, the PPR message of S4*i* specifies that the destination node is the at least temporarily unavailable second node 6, 106, even though it is being sent to the first node 4, 104. The HSS 16, 116 sends the message to the first node 4, 104 in the hope that the first node 4, 104 has a connection to the second node 6, 106 and can therefore forward the message to the second node 6, 106. Instead, the first node 4, 104 handles the message locally and responds as if it were the second node 6, 106. Diameter explicitly states that a message specifying a destination node can be handled locally if the identity of the specified destination node identity matches the identity of the local node. The intercepting node—the first node 4, 104 in the above example—ensures that the origin node identifier in the response message is the identity of the specified destination node. As such, the HSS 16, 116 is unaware that the message has been handled by a node other than the node to which the message was addressed.

In this example, the first node 4, 104 is capable of performing the at least one action associated with the message. In some examples, some or all other nodes in the cluster 2, 102 are also capable of performing the at least one action associated with the message. In some examples, the nodes are all stateless and have access to the shared data store 120. In such examples, any node in the cluster 2, 102 may be able to process the message. As such, in some specific examples, the first node 4, 104 does not need to determine the availability of the second node 6, 106 at all, for example by determining whether or not it can route a message to the second node 6, 106. The first node 4, 104 can, instead, disregard the destination node identifier—which identifies the second node 6, 106—and process messages destined for any node in its destination realm locally itself.

When a node in the cluster 2, 102 sends a registration request message, such as the SAR message of S4*b*, it indicates the realm associated with the cluster 2, 102, for example as the Origin-Realm. The node also indicates its unique node identity, for example as the Origin-Host. Specifying the unique node identity allows the recipient, in this case the HSS 16, 116, to be able to route the response back to the requesting node.

When a node in the cluster 2, 102 receives a message, such as the PPR message of S4*i*, it checks whether the destination realm, specified for example in the Destination-Realm field, matches the realm associated with the cluster 2, 102. If it does match, the node performs at least one action associated with the message itself. In other words, it handles the message locally. When responding to such a message, for example when sending the PPA message of S4*k*, the node indicates the realm associated with the cluster 2, 102, for example as the Origin-Realm. The node also indicates the unique node identity specified in the message to which it is responding, for example as the Origin-Host. In some examples, the node may otherwise ignore the unique node identity specified in the message to which it is responding.

For a message in which the specified destination realm does not contain the realm associated with the cluster 2, 102, the node may handle the message as specified in the Diameter specification.

In some examples, the cluster 2, 102 comprises only one type of node. In other words, all of the nodes in the cluster 2, 102 have a given set of attributes and there are no nodes in the cluster 2, 102 that do not have the given set of attributes. In some examples, the cluster 2, 102 only has one type of node and is the sole owner of a realm. In other words, no other types of nodes exist within the same realm. In some such examples, the given set of attributes includes the ability to intercept a message addressed to at least one other node in the cluster and handle the message locally as described in detail above. If a node in the cluster 2, 102 did not have this ability, it would need to know to forward a message addressed to an at least temporarily unavailable node to another node in the cluster 2, 102 which has the ability to process the message locally. This would not be standard Diameter behavior.

As specified in the Diameter specification, (Domain Name System) DNS Name Authority Pointer (NAPTR) and Service Records (SRV) records may be set up to resolve to the cluster 2, 102 to allow dynamic discovery. This may be used, for example, if the HSS 16, 116 is distributed across multiple HSS nodes since there may be an HSS node that does not have a connection from any of the nodes in the cluster 2, 102. This situation may occur, for example, if there are multiple HSS nodes and none of the nodes in the cluster 2, 102 is connected to a particular HSS node. Another situation in which this may occur is one in which the nodes in the cluster 2, 102 are not configured to establish a connection to the HSS 16, 116 automatically.

In some examples, when a new node is added to cluster 2, 102 (or is 'brought up'), the new node establishes a connection with the HSS 16, 116. The HSS 16, 116 records the realm associated with the new node and the unique node identifier associated with the new node, for example in its routing table. The HSS 16, 116 also adds details of the connection with the new node to its routing table.

In other examples, another identifier associated with the new node may be recorded. For example, an Internet Protocol (IP) address of the new node may be recorded. In some examples, the IP address may be added to the DNS NAPTR and SRV records to allow dynamic discovery.

When a node in the cluster 2, 102 fails (or is 'turned down'), its connection with the HSS 16, 116 also fails. If the HSS 16, 116 still has a connection in its routing table, it will try to use that connection in the future to contact the failed node. If the HSS 16, 116 has no connections in its routing table, it attempts to discover a peer node. The HSS 16, 116 may attempt to discover a peer node using DNS NAPTR and SRV. As a result, in some examples, the DNS NATPR and SRV records are updated on turning down or on discovery of a failed node.

Figure 5:
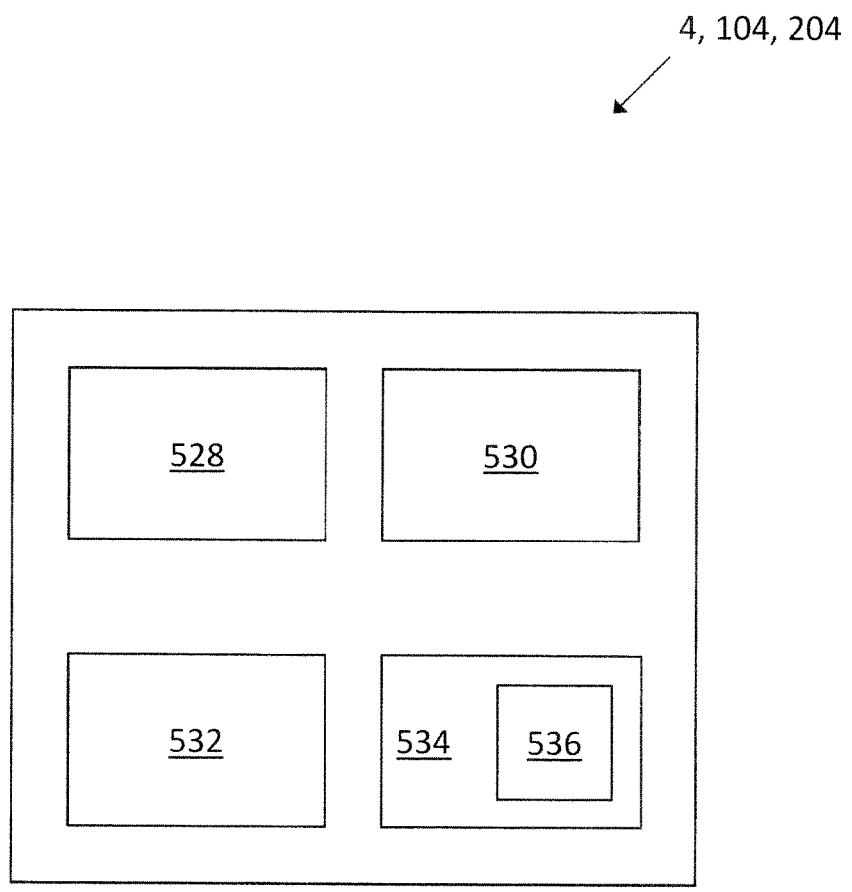
FIG. 5 shows a schematic representation of an example of a node in accordance with embodiments.

Referring to FIG. 5, there is shown schematically a representation of an example of a node in accordance with embodiments. In the specific example shown in FIG. 5, the node is the same as the first node 4, 104 shown in FIGS. 1 and 2 and is indicated using reference numeral 204 accordingly. It will however be appreciated that the second node 6, 106 and/or the third node 8, 108 can have the same or similar features.

The node 204 comprises a transmitter 528. The transmitter 538 is operable to transmit data, such as messages. The node 204 also comprises a receiver 530. The receiver 530 is operable to receive data, such as messages. Although the transmitter 528 and receiver 530 are shown as separate entities in FIG. 5, in some examples the transmitter 528 and receiver 530 are provided in a combined transceiver arrangement.

The node 204 comprises a processing unit 532. The processing unit is configured to process messages. In particular, in some examples, the processing unit 532 is configured to perform at least one action in response to a message addressed to at least one other node in the cluster being received at the node 204, and to cause a response message indicating that the at least one action has been performed to be transmitted. The processing unit 532 may be configured to receive the message addressed to at least one other node in the cluster via the receiver 530. The processing unit may be configured to cause the response message to be transmitted via the transmitter 528.

The node 204 comprises memory 534. In some examples, the memory 534 stores a computer program 536. In this regard, message processing may be implemented at least in part by the computer program 536 which is stored in the memory 534 and which is executable at least in part by the processing unit 532, or by other hardware, or by a combination of tangibly stored software and hardware (and tangibly stored firmware). Some embodiments also extend to computer programs, such as computer program 536, which are adapted, when executed, to perform message processing as described in detail herein. In some examples, the computer program 536 is provided on or in a carrier, adapted for putting the embodiments described herein into practice. The computer program 536 may be in the form of non-transitory source code, object code, or in any other non-transitory form suitable for use in processing messages as described herein. The carrier may be any entity or device capable of carrying the program, such as a RAM, a ROM, or an optical memory device.

As such, apparatus may be configured to perform message processing as described in various examples herein. Examples of such apparatus include, but are not limited to, a node, for example the node 204, and/or a processing unit, for example the processing unit 532.

The nodes 4, 6, 8, 104, 106, 108, communication device 16, 116, shared data store 120 and/or database 124 may be distributed across a number of systems or nodes. The systems may be real physical systems or virtual machines. Examples of virtual machines include but are not limited to those comprised within a virtualized data center or public or private cloud. In this way the system can scale to support a large number of subscribers.

Various measures (for example methods, apparatuses and systems) are provided in which a message is processed at a node in a cluster of nodes. A message is generated. The message comprises at least an origin cluster identifier associated with the cluster of nodes and an origin node identifier which identifies at least one other node in the cluster. The generated message is transmitted.

Various measures (for example methods, apparatuses and systems) are provided in which a message is processed at a node in a cluster of nodes. A message is received at the node. The message is addressed to at least one other node in the cluster and relates to a given user. The at least one other node is responsible for performing at least one action associated with messages relating to the given user. A request to take over responsibility for performing the at least one action associated with messages relating to the given user is transmitted in response to determining that the at least one other node in the cluster is at least temporarily unavailable.

Various measures (for example methods, apparatuses and systems) are provided in which a message is processed at a node in a cluster of nodes. A message is received at the node. The message is addressed to at least one other node in the cluster and is in accordance with the Diameter protocol. At least one action associated with the message is performed at the node. A response message indicating that the at least one action has been performed is transmitted. The response message is in accordance with the Diameter protocol.

An apparatus for processing a message at a node in a cluster of nodes is provided. The apparatus is configured to perform at least one action in response to a message addressed to at least one other node in the cluster being received at the node and cause a response message indicating that the at least one action has been performed to be transmitted.

The above embodiments are to be understood as illustrative examples. Further embodiments and examples are envisaged.

Examples have been described above in which the communication device 16, 116 is an HSS. In other examples, the communication device 16, 116 could be another Diameter agent that implements a protocol or interface, such as Cx, on which a Diameter client registers for notifications. In such other examples, the Diameter agent may function as both a server, for example to accept and respond to an initial registration request, and a client, for example to send such notifications.

Examples have been described above in which the at least one other node in the cluster 2, 102 to which the message is addressed is at least temporarily unavailable. This may include, for example, failure of the node. In other examples, at least temporary unavailability of the node may result from at least temporary lack of availability of connectivity with the node. For example, the node may still be functioning correctly, but the connection with the node may have failed, thereby making the node at least temporarily unavailable.

In some examples described above, the nodes in a cluster 2, 102 are stateless except for the shared (or 'clustered') data store 120. This means that any node in the cluster 2, 102 may be able handle a request destined for another node in the cluster 2, 102. In some other examples, at least some of the nodes in the cluster are not stateless (or are 'stateful'). In one specific example, the cluster 2, 102 divides (or 'shards') responsibility for different registrations to different nodes in the cluster. As such, the nodes can each take full responsibility for a subset of all registrations. On node failure, this responsibility may be passed to another node. In this example, while a node that does not own a registration might not be able to handle, for example, a PPR for that registration on behalf of a failed node, the PPR could at least be used as a trigger for the node to take over the registration. In this case, the node receiving the PPR may send an error message to the HSS 16, 116 but follow the error message with a User-Authorization-Request (UAR), followed by an SAR to take ownership of the registration. The UAR message, also defined in 3GPP TS 29.229 V12.1.0, is used to request the authorization of the registration of a user. In some cases, the node receiving the PPR only sends the error message after checking that the destination node has truly failed. This example may be considered to be an example of lazy re-instantiation in which a registration is only re-registered when it is determined that the registration requires an assigned node in the cluster 2, 102.

In some examples described above, a node receives a message addressed to at least one other node in the cluster 2, 102 and performs at least one action associated with the message locally. In some such examples, the message is addressed to a node that made an initial request with the intention that the message could be routed back to the node that made the initial request. This may be desirable in transaction-stateful networks 1, 101 in which it is desirable or necessary for the node that makes the initial request to handle any related messages from the HSS 16, 116.

In other examples, the network 1, 101, or at least some of the nodes in the cluster 2, 102, may be transaction-stateless. In other words, it may not be desirable or necessary for the node that makes the initial request to handle any related messages from the HSS 16, 116. In such other examples, the node that makes the initial request may be able to indicate an arbitrary origin node identifier. In some specific examples, therefore, a node sending a SAR message to the HSS 16, 116 may be configured to indicate an origin node identifier arbitrarily, for example in an Origin-Host field.

In some examples described above, a node is configured to handle all messages addressed to the realm associated with the cluster 2, 102 in which it is comprised. In some other examples, a node is configured to handle a subset of messages. For example, the node may be configured to handle only messages of a particular type. In other words, the node may be configured to handle messages having a given set of attributes and may not be configured to handle messages that do not have the given set of attributes. In some specific examples, the node may be configured to handle only PPR messages and/or Registration-Termination-Request (RTR) messages but not other types of requests. An RTR message, also defined in 3GPP TS 29.229 V12.1.0, can be sent to request de-registration of a subscriber. In some examples, the node may be configured to handle a message itself where the message can be processed using the shared data store 120 and may be configured not to handle a message that cannot be processed using the shared data store 120. In some such examples, the node may instead be configured to attempt to forward a message that cannot be processed using the shared data store 120 to the node to which the message is addressed. If the node to which the message is addressed is at least temporarily unavailable, then suitable action, for example sending an error message, may be taken. In these examples, the other types of request would not be processed at the node, but this might give better overall system behavior.

Examples have been described above in which messages are specified in accordance with the Diameter protocol and/or in which messages are transmitted and/or received via a Cx interface. Other types of message and interface are envisaged. For example, another Diameter-based interface in which notifications are routed to a node and realm received in a previous registration request could be used. Furthermore, although references have been made above to the Diameter Base Protocol, as currently specified in RFC 6733, reference to Diameter should be understood not to be so limited and to cover future versions of the Diameter protocol.

Examples have been described above in which the received message in relation to which at least one action is performed comprises an information update message that comprises information to be updated. In some examples, the received message in relation to which at least one action is performed comprises a request to perform the one or more actions. For example, the received message could comprise a request to update subscriber profile information and may also comprise the updated subscriber profile information. In other examples, the received message could comprise a request to perform one or more actions, without being accompanied by updated information.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing a message at a Diameter node in a cluster of Diameter nodes having access to a clustered data store, the method comprising:
    intercepting the message at the Diameter node in the cluster of Diameter nodes, the message being addressed to at least one other Diameter node in the cluster of Diameter nodes, the intercepted message relating to updating subscriber-related information in the clustered data store;
    updating, by the Diameter node, the subscriber-related information in the clustered data store; and
    transmitting, by the Diameter node, a response message indicating that the at least one other Diameter node has updated the subscriber-related information although it is the Diameter node that has updated the subscriber-related information.

2. The method according to claim 1, wherein the intercepted message and/or the response message is in accordance with Diameter base protocol.

3. The method according to claim 1, comprising determining a status of the at least one other Diameter node.

4. The method according to claim 1, wherein the updating of the subscriber-related information is in response to determining that the at least one other Diameter node is at least temporarily unavailable.

5. The method according to claim 1, wherein the updating of the subscriber-related information occurs irrespective of a status of the at least one other Diameter node.

6. The method according to claim 1, wherein the intercepted message comprises at least one destination identifier and wherein the at least one destination identifier comprises a destination cluster identifier or a destination node identifier.

7. The method according to claim 1, wherein the response message comprises at least one origin identifier and wherein the at least one origin identifier comprises an origin cluster identifier or an origin node identifier.

8. The method according to claim 1, wherein the intercepted message is received and/or the response message is transmitted via a Cx interface.

9. The method according to claim 1, wherein the intercepted message comprises a Push-Profile-Request message or a Registration-Termination-Request message and/or wherein the response message comprises a Push-Profile-Answer message or a Registration-Termination-Answer message.

10. The method according to claim 1, wherein the intercepted message is received from and/or the response message is transmitted to a communication device having access to a subscriber profile database.

11. The method according to claim 1, wherein the Diameter node and/or the at least one other Diameter node comprises a call session control function entity.

12. The method according to claim 1, wherein the updating of the subscriber-related information is dependent upon one or more characteristics of the intercepted message.

13. The method according to claim 1, comprising inhibiting transmission of the intercepted message to the at least one other Diameter node.

14. The method according to claim 1, comprising generating the response message.

15. The method according to claim 1, wherein the intercepted message comprises a request to update the subscriber-related information.

16. A system for processing a message at a Diameter node in a cluster of Diameter nodes having access to a clustered data store, the system comprising at least one memory including computer program code and at least one processor in data communication with the at least one memory, wherein the at least one processor is configured to:
- intercept the message at the Diameter node in the cluster of Diameter nodes, the message being addressed to at least one other Diameter node in the cluster of Diameter nodes, the intercepted message relating to updating subscriber-related information in the clustered data store;
- update, at the Diameter node, the subscriber-related information in the clustered data store; and
- cause a response message to be transmitted by the Diameter node, the response message indicating that the at least one other Diameter node has updated the subscriber-related information although it is the Diameter node that has updated the subscriber-related information.

17. The system according to claim 16, comprising:
- a receiver operable to receive the message that is addressed to the at least one other Diameter node; and
- a transmitter operable to transmit the response message.

18. A computer program product comprising a non-transitory computer-readable storage medium having computer readable instructions stored thereon, the computer readable instructions being executable by a computerized device to cause the computerized device to perform a method of processing a message at a Diameter node in a cluster of Diameter nodes having access to a clustered data store, the method comprising:
- intercepting the message at the Diameter node in the cluster of Diameter nodes, the message being addressed to at least one other Diameter node in the cluster of Diameter nodes, the intercepted message relating to updating subscriber-related information in the clustered data store;
- updating, by the Diameter node, the subscriber-related information in the clustered data store; and
- transmitting, by the Diameter node, a response message indicating that the at least one other Diameter node has updated the subscriber-related information although it is the Diameter node that has updated the subscriber-related information.

* * * * *